(12) United States Patent
Ngai

(10) Patent No.: US 8,805,407 B2
(45) Date of Patent: Aug. 12, 2014

(54) METHODS AND APPARATUS TO SCAN A WIRELESS COMMUNICATION SPECTRUM

(75) Inventor: Dominic H. Ngai, Plano, TX (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 63 days.

(21) Appl. No.: 13/601,710

(22) Filed: Aug. 31, 2012

(65) Prior Publication Data

US 2014/0066060 A1    Mar. 6, 2014

(51) Int. Cl.
  *H04W 88/00*  (2009.01)
(52) U.S. Cl.
  USPC ........................................ 455/456.1
(58) Field of Classification Search
  USPC ...................... 455/456.1, 450, 434
  See application file for complete search history.

(56) References Cited

U.S. PATENT DOCUMENTS

| | | | |
|---|---|---|---|
| 5,982,305 A | 11/1999 | Taylor | |
| 6,052,406 A | 4/2000 | Epstein et al. | |
| 7,302,243 B2 | 11/2007 | Tarbouriech | |
| 7,623,823 B2 | 11/2009 | Zito et al. | |
| 2007/0174876 A1 | 7/2007 | Maggio et al. | |
| 2008/0249976 A1 | 10/2008 | Ojanpera | |
| 2010/0242103 A1* | 9/2010 | Richardson et al. | 726/7 |
| 2010/0246544 A1* | 9/2010 | Brisebois et al. | 370/338 |
| 2010/0257052 A1 | 10/2010 | Zito et al. | |
| 2012/0101827 A1 | 4/2012 | Topchy et al. | |
| 2013/0189977 A1* | 7/2013 | Brisebois et al. | 455/434 |
| 2013/0310032 A1* | 11/2013 | Islam et al. | 455/434 |

* cited by examiner

*Primary Examiner* — Diane Mizrahi
(74) *Attorney, Agent, or Firm* — Hanley, Flight and Zimmerman, LLC

(57) ABSTRACT

Methods and apparatus are disclosed to scan a wireless communication spectrum. An example method disclosed herein includes causing a first scanner to determine, for a frequency of a wireless communication spectrum, a decoded base station identifier, causing a second scanner to determine a plurality of signal strengths at the frequency without determining a base station identifier, and determining that the base station identifier is associated with a subset of the plurality of signal strengths by comparing at least one of timestamps and locations associated with the base station identifier and the plurality of signal strengths.

27 Claims, 16 Drawing Sheets

- Ⓐ SCANNER A MEASUREMENTS
- ● SCANNER B MEASUREMENTS

METHODS AND APPARATUS TO SCAN A WIRELESS COMMUNICATION SPECTRUM

FIELD OF THE DISCLOSURE

This disclosure relates generally to wireless network monitoring, and, more particularly, to scanning a wireless communication spectrum.

BACKGROUND

Frequency or channel scanners are generally used in network planning. A scanner used in cellular communication networks, such as the Global System for Mobile Communications (GSM), can determine the signal strength of signals transmitted on channels in the wireless network spectrum, allowing carriers or users of the network to determine the best locations to receive service or where better service is needed or not needed. Scanners may generally scan all frequencies or subset of frequencies of the communication network spectrum and sample information from any frequencies that are identified. Generally speaking, signals are only detected on frequencies used by base stations in the area.

Accordingly, the scanner can sample signals on the identified frequencies and decode information transmitted over the channels to obtain identifying information, such as a base station identification code (BSIC). A base station identification code is a unique identifier used in GSM to identify a base station. When considering the size of the spectrum or network, the number of channels being scanned directly affects the amount of time required to scan the network spectrum and to decode the channel information.

Typically, each cell of the cellular communication network is assigned a unique base station control channel (BCCH). Each cell is also assigned a BSIC. A BCCH is a broadcast channel used by a base station to send information about the identity of the network. Depending on the power output of the base station, the BCCH, BSIC pair will be unique for a cell range radius.

DETAILED DESCRIPTION

Figure 1A:
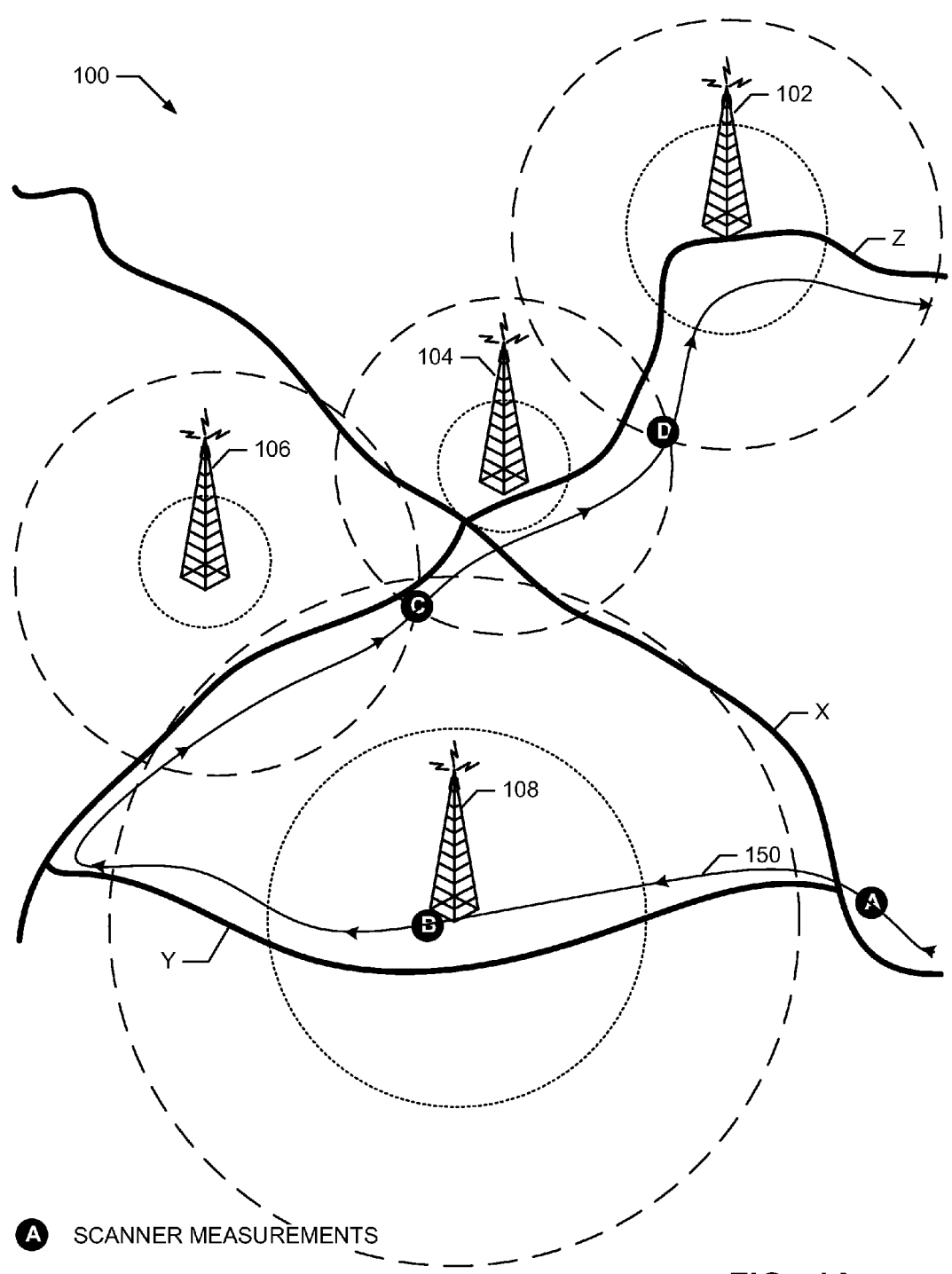
FIGS. 1A-1C illustrate an example wireless communication environment of use for a scanning device constructed in accordance with the teachings of this disclosure.

When scanners are used to both measure signal strength and decode channel information to identify a base station identification code (BSIC), the sampling rate is typically rather slow. Therefore, the length of time to receive the signal strength measurement and decode the BSIC could be a rather lengthy period of time (e.g. up to 20 seconds). If a user is traveling at a high rate of speed over the course of that period of time, the user will be unable to accurately determine the location corresponding to the signal strength measurement.

Removing the decoding process from the scanner allows the scanner to drastically increase its scanning rate. Although this provides a more accurate reading of the geographic location at which a signal strength measurement occurred, the ability to identify the source of that signal (e.g. the BSIC) is lost. However, because each cell generally has a unique base station control channel (BCCH) and BSIC pair, for those areas where the BSIC has already been successfully decoded, the BSIC can be correlated to signal strength measurements made within the cell, without having to decode the BSIC information when taking those signal strength measurements.

Methods and apparatus to scan a wireless communication spectrum are disclosed herein. Example methods disclosed include causing a first scanner to determine for a signal detected at a first frequency a decoded base station identifier and causing a second scanner to determine a plurality of signal strength measurements for a plurality of signals detected at the first frequency without determining a base station identifier. Such example methods also include determining that the base station identifier is associated with a subset of the plurality of signals by comparing at least one of timestamps and locations associated with the base station identifier and the plurality of signal strength measurements.

In some examples, the wireless communication spectrum is a global system for mobile communications (GSM) network. In some examples, the first and second scanners are the same scanner having two digital signal processors (DSPs). In some examples, the first and second scanners operate substantially simultaneously. In some examples the first and second scanners scan different frequencies of the wireless communication spectrum at the same time. In some examples the first and second scanners are instructed or programmed to scan multiple frequencies in the wireless communication spectrum. In some examples, the first and second scanners store the BSIC and the signal strength measurements in a database. In some examples, the first scanner determines a plurality of signal strength measurements for a plurality of signals on the same frequency. In some examples the first scanner 210 scans at a slower rate than the second example scanner 220 because the output of the second scanner not used to decode channel information to determine a BSIC.

In some examples, the BSIC is timestamped to record a time at which a signal is decoded and the signal strength measurement is timestamped to record a time at which the signal strength of a signal is measured. These timestamps are used to associate the BSIC to the signal strength measurements for a given frequency; thereby eliminating the need for the first and second scanners to operate on the same frequency at the same time. In some examples, the first scanner takes measurements at a rate slower than the second scanner. In some examples, a geographic location of the device where BSIC information is decoded for the frequency and where signal strength is measured for the frequency is detected. This geographic location is used to associate the BSIC to the signal strength measurement. In some examples both timestamping and determining a geographic location are used as described above to determine that a BSIC decoded based on the output of the first scanners associated with a signal strength measurement of the second scanner.

Disclosed example methods, apparatus, and/or articles of manufacture enable a scanner to scan a wireless a communications spectrum to determine an increased number of signal measurements in a given time period relative to prior art scanners while also being able to determine the source of the signals received.

Figure 1B:
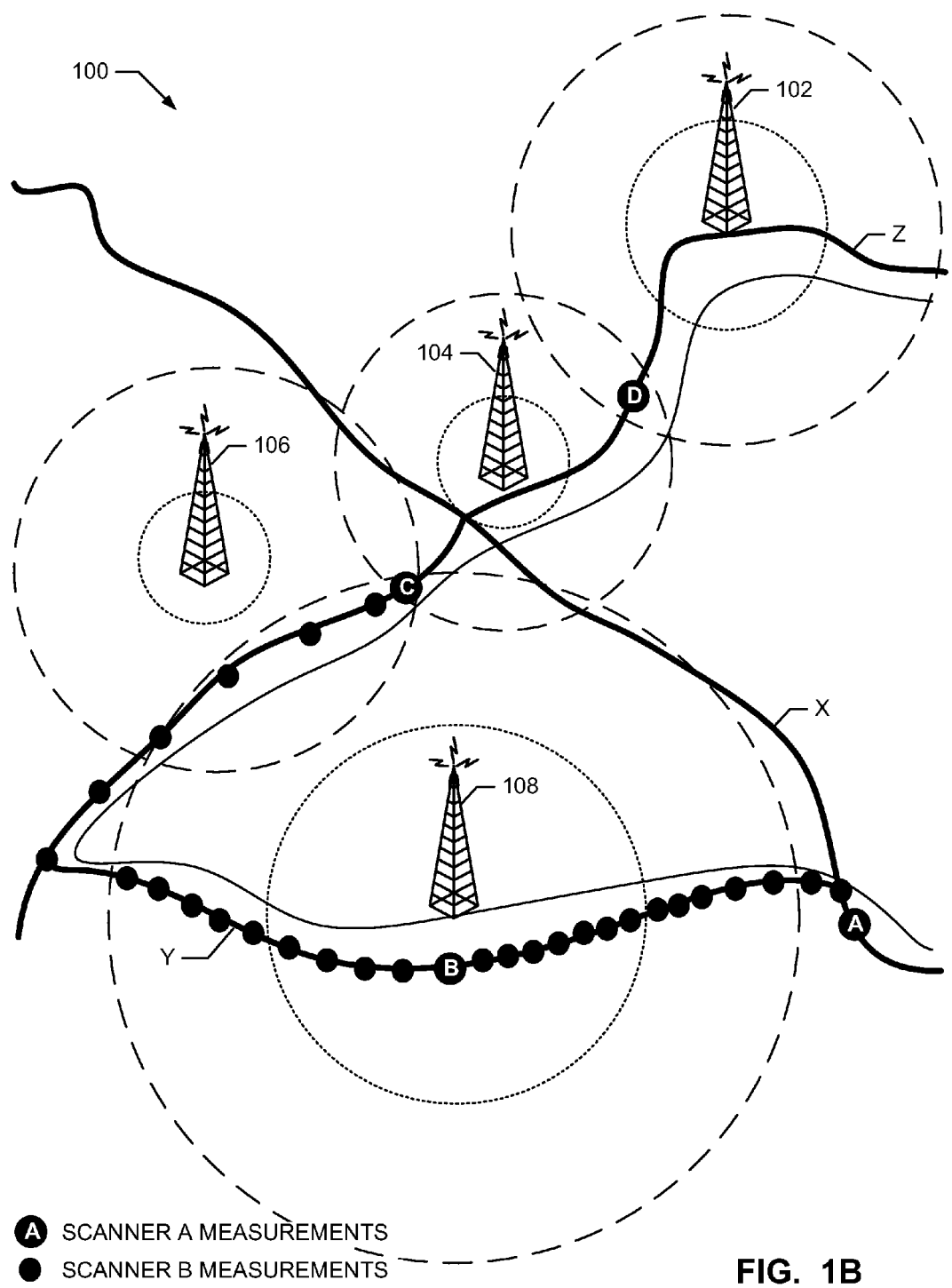
Figure 1C:
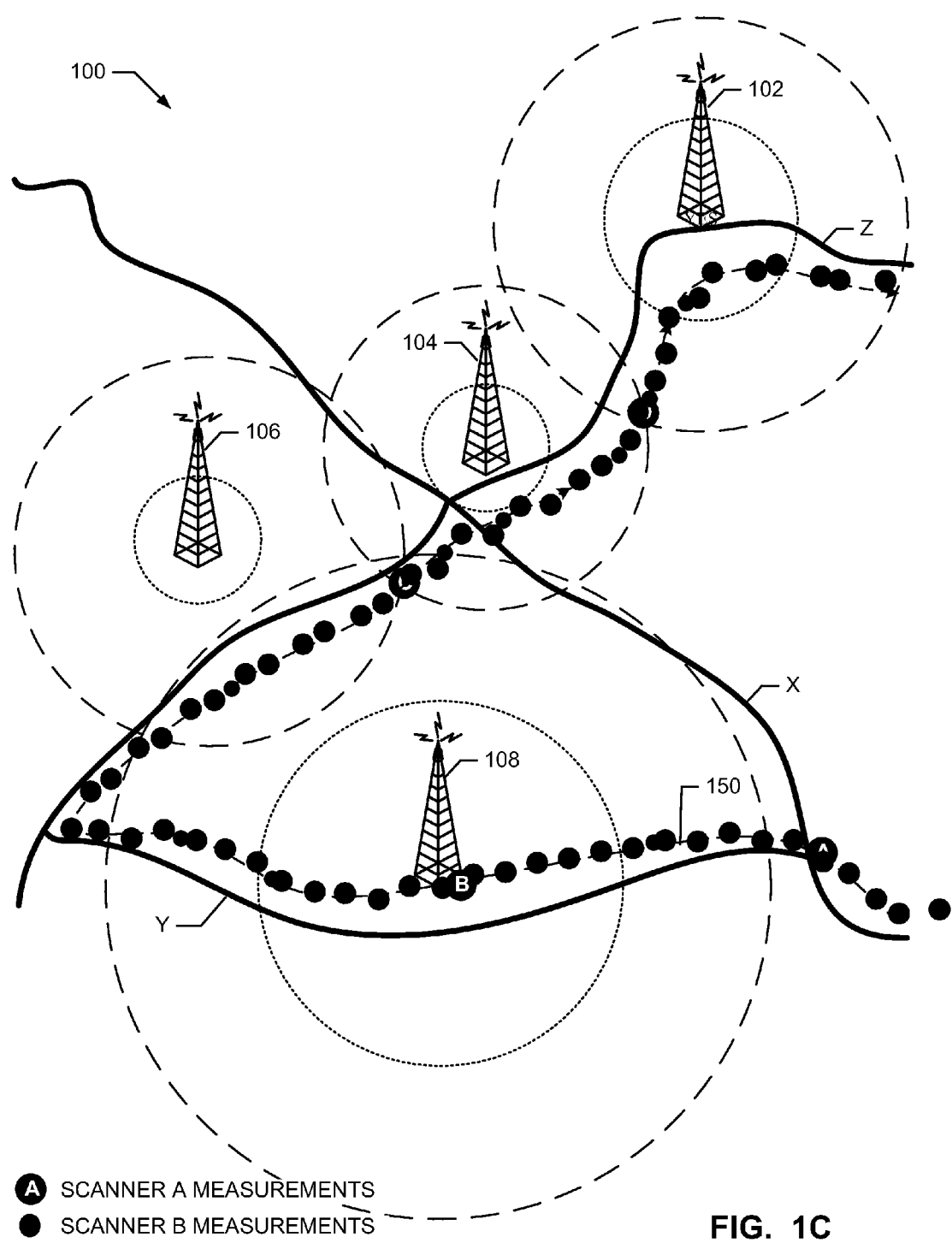

FIGS. 1A-1C illustrate an example wireless communication environment 100, such as a portion of the Global System for Mobile Communications (GSM). The example environment 100 of FIGS. 1A-1C depicts four example base stations 102, 104, 106, 108, three example highways X, Y, Z, and four measurement locations A, B, C, D along those roads. FIG. 1C also includes a side street 150. The large diameter dashed circles surrounding the base stations 102, 104, 106, 108 identify the area coverage (e.g. a cell around the respective base station). The smaller diameter circles concentric with the larger diameter circles represent an area having high signal strength. Accordingly, measurement location A is not within range of any of the base stations 102, 104, 106, 108; measurement location B is within a range of base station 108 having high signal strength; measurement location C is within range of base stations 104, 106, 108; and measurement location D is within range of base stations 102, 104.

An example scanning device as disclosed herein is used in the example environment 100 to measure the signal strengths of signals transmitted at different frequencies of the communication spectrum at the given locations A, B, C, D and to identify any base station(s) from which any such detected signals are broadcast. In some examples the signals are transmitted in frequencies corresponding to broadcast control channels (BCCH) that are unique to each of the base stations. In such examples, base stations 102, 104, 106, 108 may be assigned BCCHs #2, #4, #6, #8, respectively.

In the illustrated examples, measurement location A is located outside the range of any of the base stations 102, 104, 106, 108. Therefore, an example scanning device at location A would not detect signals on any frequencies (e.g., BCCHs #2, #4, #6, #8) of the wireless communication network 100, and thus would not detect any of the base stations 102, 104, 106, 108 from which any of the signals are broadcast.

Measurement location B of the illustrated example is located within range of base station 108. Accordingly, an example scanning device at location B would be able to measure signal strength of a signal transmitted at the frequency (e.g. BCCH #8) broadcast from base station 108 and, with sufficient time, to decode the BSIC for base station 108. Furthermore, the close proximity of location B, shown within the smaller of the concentric circles surrounding the base station 108, in the illustrated example indicates the likelihood of a greater signal strength from the base station 108.

Measurement location C of the illustrated example is located within range of base stations 104, 106, 108. Accordingly, an example scanning device at location C would be able to measure a signal strength of signals transmitted at the respective frequencies (e.g. BCCH #4, BCCH #6, and BCCH #8) by the base stations 104, 106, 108. Furthermore, with sufficient time, the example scanning device would be able to decode the BSIC for each of the base stations 104, 106, 108 to determine the source of the frequency or BCCH at that location.

In the illustrated example, measurement location D is located within range of base stations 102, 104. Therefore, the example scanning device at location D would be able to measure a signal strength of the signals transmitted at the frequencies of the base stations 102, 104, for example BCCH #2 and BCCH #4, respectively. Furthermore, with sufficient time, the example scanning device would be able to decode the BSIC for each of the base stations 102, 104 to determine the source of the frequency or BCCH at that location.

In the illustrated example of FIG. 1, the four measurement locations A, B, C, D provide a user with a signal strength and BSIC to identify the source of the signal detected at those locations. In the illustrated example, four measurements are taken consecutively at locations A, B, C, D by a prior art scanning device traveling (e.g. within an automobile) along a side street 150. The prior art scanning device is unable to take a valuable number of signal strength measurements on side street 150 due to the fact that the scanner must decode the BSIC information between measurements at locations A, B, C, D and the speed limit along paths XYZ require the automobile to travel too fast for the calculations to be completed. Specifically, if the prior art scanning device is traveling (e.g. within an automobile) on side street 150, a measurement may be taken at location B. However, the device may reach location D on route Z before having the processing capacity to make another signal strength measurement because of the slow sampling rate of the prior art scanner due to decoding the BSIC.

To overcome the problem, scanners that decode the BSIC for frequencies of a wireless communication spectrum and make signal strength measurements at an increased rate of speed to provide a greater number of signal measurements are disclosed herein. FIG. 1B shows example measurement locations (circles along highways Y, Z) which may be utilized by the example scanning device 200 of FIG. 2. Because of the increased scanning rate and the fact that two scanners are utilized, the traveling speed of the example scanning device 200 can be faster than the prior art as explained below with regard to FIGS. 3A-3D. Thus, rather than traveling on slower side street 150 of FIG. 1A, the example scanner 200 travels on the faster route (X, Y, Z; a highway with a higher speed limit) in FIG. 1B.

Figure 2:
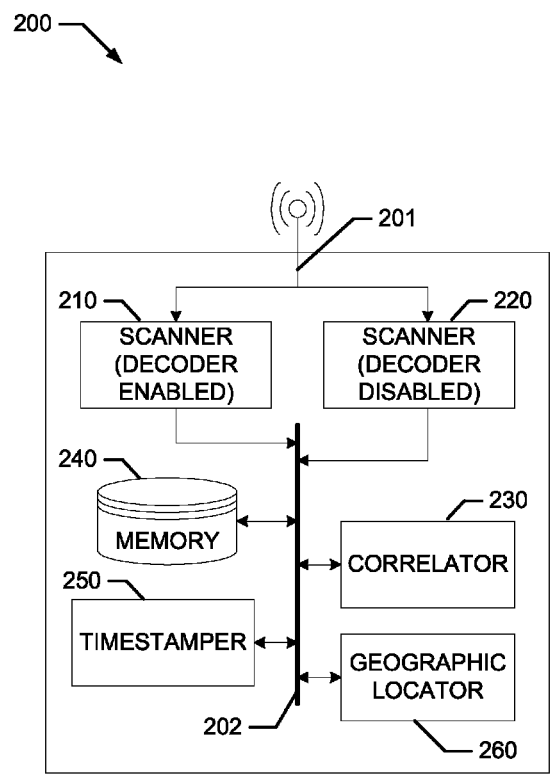
FIG. 2 is a block diagram of an example scanning device constructed in accordance with the teachings of this disclosure.

Additionally, FIG. 1C shows example measurement locations (circles along side street 150) which may be utilized by the example scanning device 200 of FIG. 2. In FIG. 1C, the example scanning device 200 is traveling the same route as the prior art scanning device of FIG. 1A, however, because of the increased scanning rate and the fact that two scanners are utilized, the number of measurements along the route can be drastically increased as explained below with regard to FIGS. 3A-3D. Thus, rather than only receiving a minimal amount of measurements, the example scanner 200 makes drastically more (up to twenty times more) measurements, as shown in FIG. 1C, while on the same route and traveling the same speed as the prior art scanner in FIG. 1A.

FIG. 2 illustrates example scanning device 200 that may be used in the illustrative environment of FIG. 1B. The example scanning device 200 includes an example antenna 201, an example first scanner 210, an example second scanner 220, an example correlator 230, an example storage device 240, an example timestamper 250, and an example geographic locator 260. The example scanning device 200 of FIG. 2 includes an example communication bus 202 that facilitates communication between the first scanner 210, the second scanner 220, the correlator 230, the storage device 240, the timestamper 250, and the geographic locator 260.

The example scanning device 200 of FIG. 2 scans frequencies of a wireless communication spectrum of a wireless communication network, such as the illustrated example environment 100 of FIG. 1B, using the example first scanner 210 and second example scanner 220. In some examples, the first example scanner 210 scans each of the frequencies of the wireless communication spectrum via antenna 201 with BSIC decoding enabled, thus receiving a signal strength measurement and decoding information transmitted at each of the frequencies to determine the BSIC for each identified frequency. In some examples, the second example scanner 220 scans each of the frequencies of the wireless communication spectrum via antenna 201 with the BSIC decoding disabled, thus receiving a signal strength measurement without determining a BSIC for any of the scanned frequencies. In some examples, when the second example scanner 220 scans the frequencies with BSIC decoding disabled, the sampling rate of the scans is faster (e.g. up to twenty times faster) than the sampling rate of the first example scanner 210 with BSIC decoding enabled. In some examples, if the first example scanner 210 and/or the second example scanner 220 do not detect a signal at a given frequency during a measurement or if the signal strength of the signal detected at the given frequency is below a threshold value (e.g. −120 dBm), null data is stored for the corresponding frequency. Any appropriate techniques for scanning the frequencies of the wireless communication spectrum may be employed, such as scanning all frequencies of the wireless communication spectrum or a subset of the frequencies of the communication spectrum.

Figure 12:
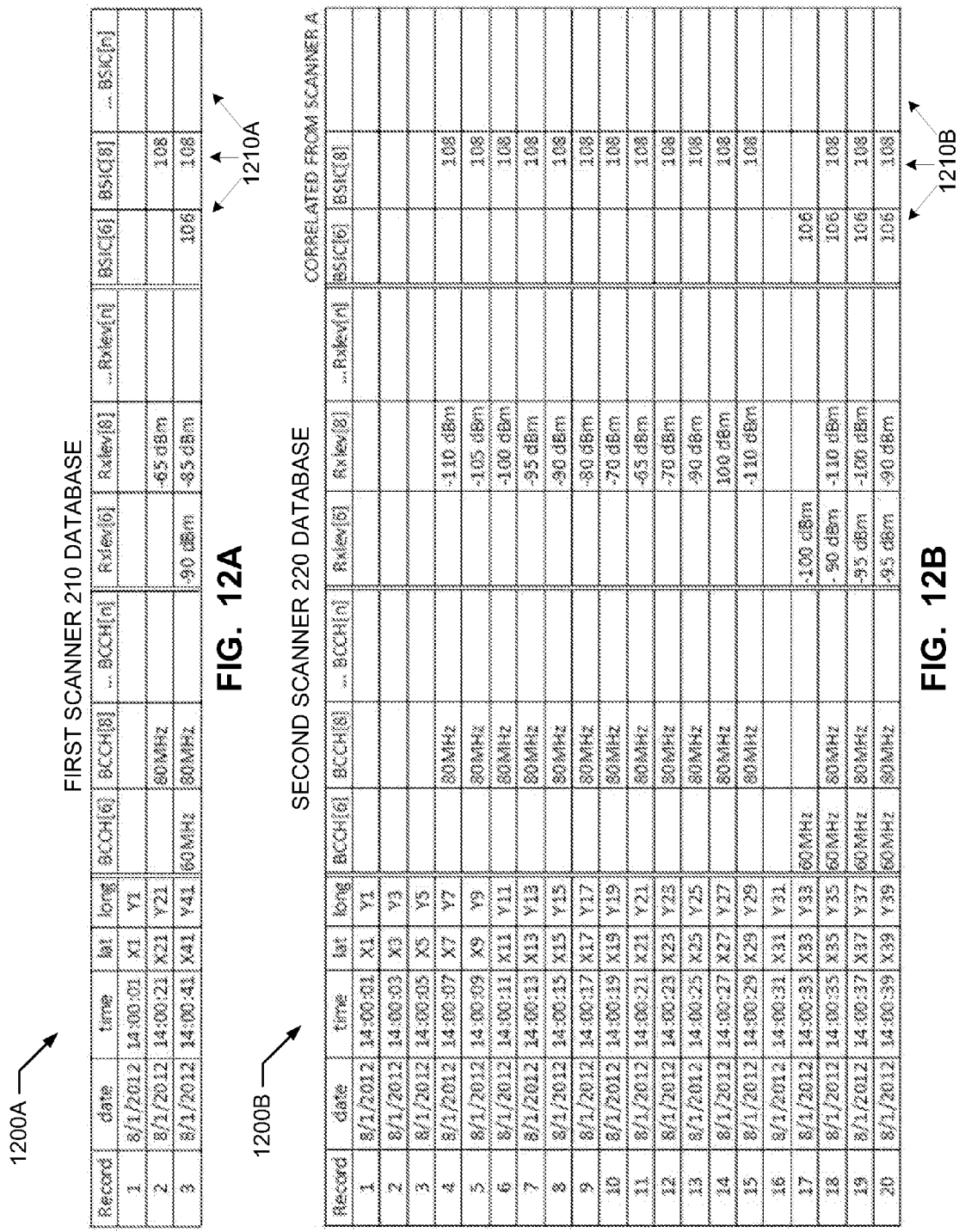
FIGS. 12A-12B illustrate example data structures stored in example databases of the example scanning device of FIG. 2.

The first example scanner 210 and the second example scanner 220 of the illustrated example record information (e.g. signal strength measurements, BCCH, and/or BSIC, etc.) detected and/or derived from frequencies of the wireless communication spectrum in example storage device 240. In some examples, the first example scanner 210 stores the recorded information in a first data structure separate from a second data structure in which the second example scanner 220 stores data. The first and second data structures may be in the same or different databases and/or in the same of different data storage device(s). Example data structures are shown in FIGS. 12A and 12B for recording information collected by the first example scanner 210 and the second example scanner 220, respectively. The example data structures of FIGS. 12A and 12B may be stored in the storage device 240.

The correlator 230 of the illustrated example accesses the recorded measurements from the first example scanner 210 and the second example scanner 220 via the storage device 240. Correlator 230 determines whether to associate BSIC information for scanned frequencies of the wireless communication spectrum from the first example scanner 210 are to scanned frequency measurements of the wireless communication spectrum from the second example scanner 220. The example correlator 230 crosschecks the recorded frequency measurements from the first example scanner 210 with the recorded frequency measurements of the second example scanner 220. In some examples, where the first example scanner 210, having BSIC decoding enabled, records the BSIC for the frequency measurements and the second example scanner 220, having BSIC decoding disabled, does not record the BSIC for the frequency measurements, the correlator 230 determines that the measurements of the second example scanner 220 should be associated with a BSIC based on the corresponding frequency measurements from Scanner 210. In some examples, the correlator writes the BSIC information to the corresponding frequency measurements from the second example scanner 220 to an example data structure (see FIG. 12B) stored in the storage device 240. Accordingly, the correlator 230 of the illustrated example associates measurements corresponding to a certain frequency (e.g. BCCH) measured in the second example scanner 220 to a BSIC decoded by the first example scanner 210 for that frequency based on one or more characteristics (e.g. a timestamp and/or geolocation) of the measurements.

The timestamper 250 of the illustrated example records a timestamp when each measurement of the frequencies scanned by the first example scanner 210 and the second example scanner 220 is made and stores the timestamp with the corresponding measurement in the database 240. In some examples, the timestamper records a time stamp each time the first example scanner 210 and the second example scanner 220 each begins scanning frequencies of the wireless communication spectrum. The timestamp is stored along with a corresponding measurement in a time field of an example data structure (see FIGS. 12A, 12B) stored in the storage device. In the example data structure of FIGS. 12A, 12B, an example recorded measurement has a timestamp associated with each measurements of the communication spectrum.

The example geographic locator 260 (e.g. Global Positioning System (GPS)) of the illustrated example records a physical location (e.g. latitude and longitude) where each measurement of the frequencies scanned by the first example scanner 210 and/or the second example scanner 220 is made. The geographic location is stored in the database 240 with the corresponding measurement. In some examples, the geographic locator 260 records a latitude and longitude each time the first example scanner 210 and/or the second example scanner 220 each begins scanning a frequency of the wireless communication spectrum. In some examples, the geographic locator 260 stores the latitude and longitude with a corresponding measurement in corresponding data fields of an example data structure (see FIGS. 12A, 12B) stored in the storage device. As a result, the example data structures of FIGS. 12A, 12B, has one latitude and one longitude associated with each measurement record.

In some examples, the correlator 230 of FIG. 2 uses information from the timestamper 250 and/or the geographic locator 260 to determine which measurement records of the first example scanner 210, if any, are associated with scanner records of the second example scanner 220 stored in the storage device 240. In some examples, the correlator 230 uses a time stamp stored in the storage device 240 by the timestamper 250 and/or the geographic location (e.g. latitude and longitude) stored in the storage device 240 to determine which measurement records of the first example scanner 210, if any, are associated with scanner records of the second example scanner 220. In some examples, the correlator 230 of the illustrated example receives a time stamp indicating when a measurement record was made directly from the timestamper 250. In some examples, the correlator 230 of the illustrated example receives a geographic location (e.g. latitude and longitude) where a measurement record was made directly from the geographic locator 260.

In some examples, when attempting to match records, the correlator 230 of FIG. 2 references an example time window setting and/or an example area radius setting stored in the storage device 240 or within the correlator 230. The example time window setting is used to generate subsets of respective measurement records created by the first example scanner 210 and the second example scanner 220. In some examples, when a timestamp for a measurement record of the second example scanner 220 for a given frequency is within a time period designated by the time window setting of the first example scanner 210 for the same frequency, the correlator 230 associates a BSIC decoded from a record generated by the corresponding measurement record of the first example scanner 210 to the corresponding measurement records of the second example scanner 220. For example, if the first example scanner 210 decodes a BSIC for a frequency, such as BCCH #1, within the same time period of when the second example scanner 220 determined a signal strength measurement of BCCH #1, then the measurement record of the second example scanner 200 is associated with the BSIC decoded by the first example scanner 210. In some examples, where T represents the example time window setting and $T_B$ represents an example timestamp for a measurement record of the second example scanner 220, the example correlator 230 will review records generated by the first example scanner 210 within the time period is from $(T_B-T/2)$ to $(T_B+T/2)$ for a match with the records generated by the second examples scanner 220. An example radius setting is used by the example correlator 230 of FIG. 2 to compare respective geographic locations of measurement records for the first example scanner 210 and the second example scanner 220. In some examples, when a geographic location (e.g. latitude and longitude) for a measurement record of the first example scanner 210 for a given frequency is within a radius, designated by the radius setting, of the second example scanner 220 for the same frequency, the correlator 230 associates a BSIC decoded from that frequency from the corresponding measurement record of the first example scanner 210 to the corresponding frequency of the corresponding measurement records of the second example scanner 220 within which the frequency was successfully sampled. For example, if the first example scanner 210 decodes a BSIC for a frequency, such as BCCH #1, within a distance radius of where a measurement record of the second example scanner 220 determined a signal strength measurement of BCCH #1, then the measurement record of the second example scanner 220 is associated with the BSIC decoded by the first example scanner 210.

Figure 3A:
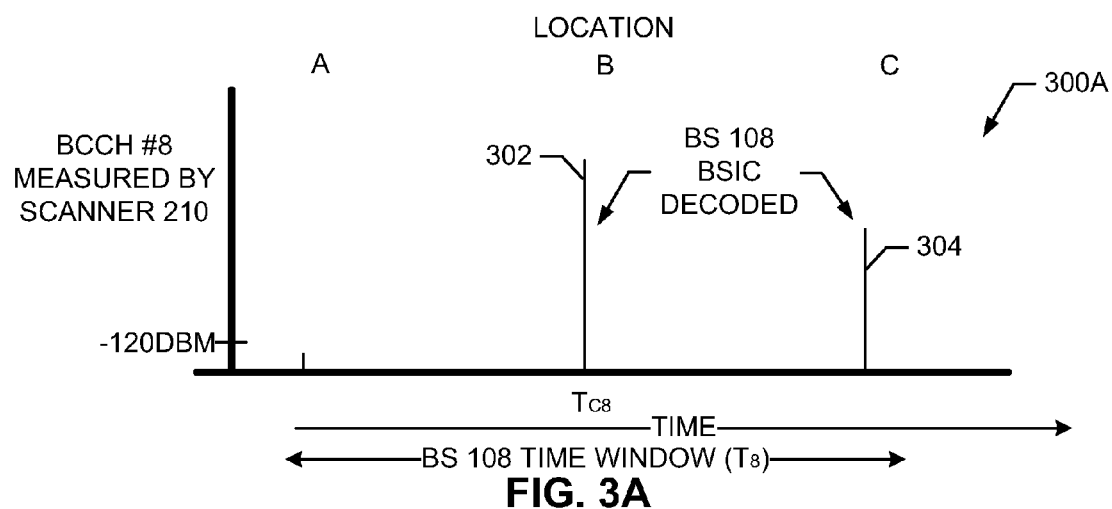
FIGS. 3A-3D are graphs demonstrating example signal measurements of the example scanning device of FIG. 2 being used in the example wireless communication environment of FIG. 1 for a first channel (FIGS. 3A-3B) and a second channel (FIG. 3C-3D).
Figure 3B:
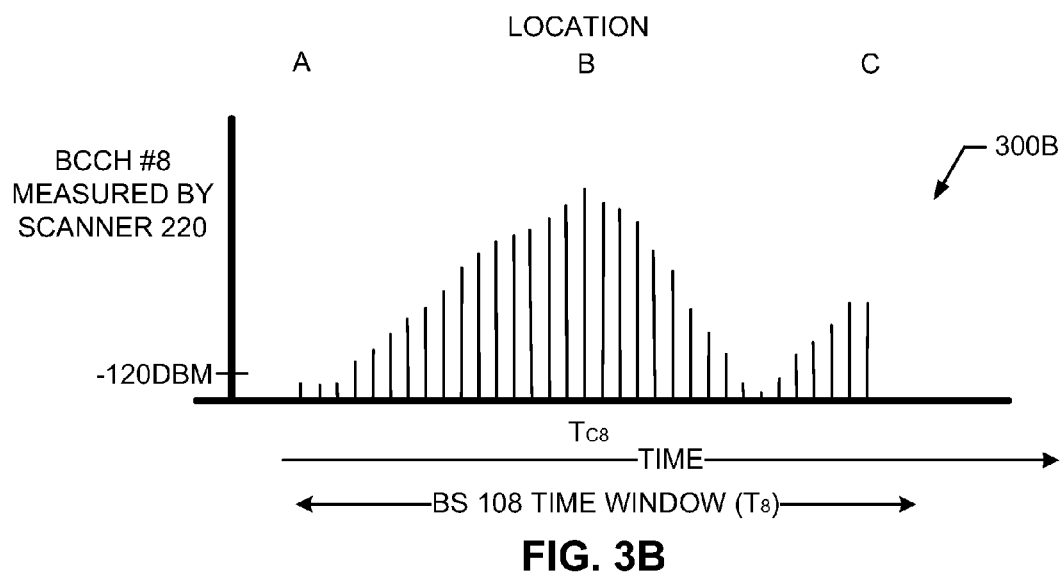
Figure 3C:
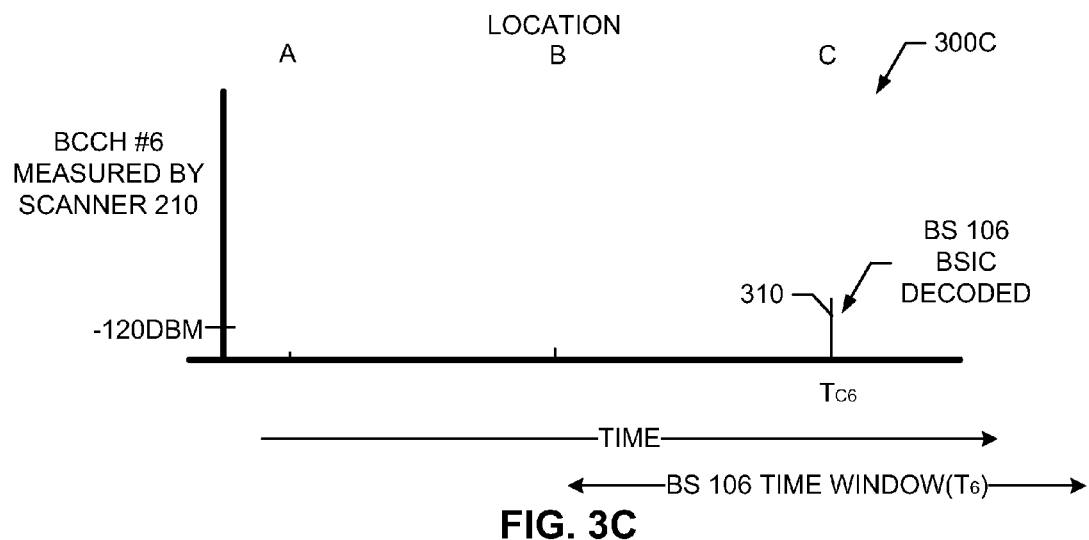
Figure 3D:
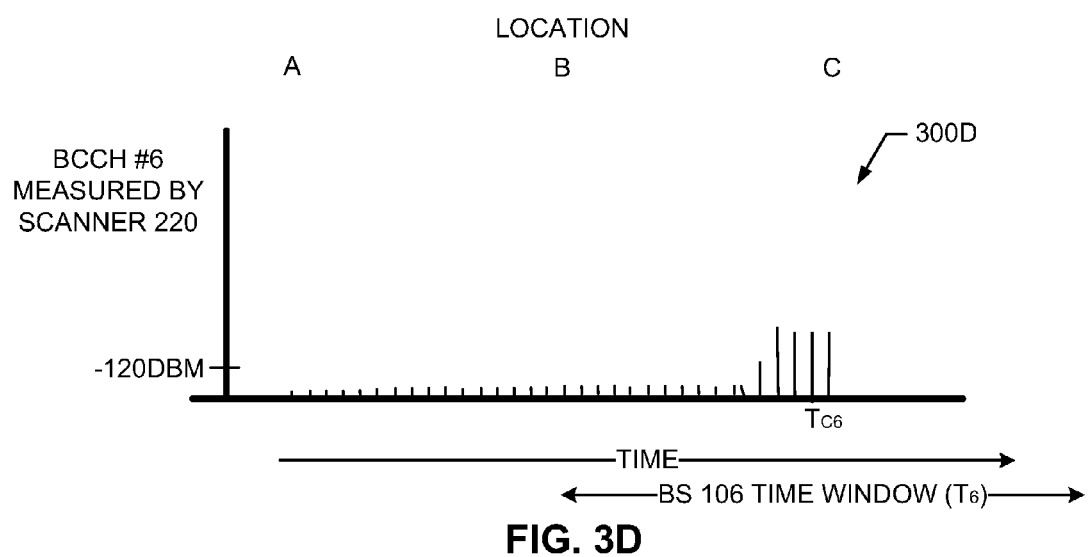

FIGS. 3A-3D are graphical representations of a first scanned frequency (BCCH #8) (shown in FIGS. 3A, 3B) and a second scanned frequency (BCCH #6) (shown in FIGS. 3C, 3D) displaying signal strength measurements for the corresponding channels over time. FIGS. 3A, 3C are graphical representations of signal measurements of the first example scanner 210 with BSIC decoding enabled. FIGS. 3B, 3D are graphical representations of example signal measurements of the second example scanner 220 with BSIC decoding disabled. FIGS. 3A-3D include location information of where signal measurements were taken corresponding to the measurement locations of FIG. 1B.

Referring specifically to FIGS. 3A and 3B, the first example scanner 210 and the second example scanner 220 sample a signal corresponding to a frequency, BCCH #8, broadcast from example base station 108 in accordance with FIG. 1B. FIG. 3A illustrates signal strength measurements 300A taken by the first example scanner 210 with BSIC decoding enabled. In some examples the first example scanner 210 samples a signal corresponding to frequency BCCH #8 to determine signal strength measurements 300A during a same time period that the second example scanner 220 samples frequency BCCH #8 to determine signal strength measurements 300B. In FIG. 3A, the second and third of signal strength measurements 302, 304 are shown as being taken at locations B and C, respectively. A BSIC of base station 108 is determined by decoding BCCH #8 twice, once by decoding signal 302 and once by decoding signal 304. Because location A is outside of the range of base station 108, a minimal signal strength measurement is, if any, made by the first example scanner 210 as shown in FIG. 3A and/or the second example scanner 220 as shown in FIG. 3B. Consequently the first example scanner 210 cannot determine a BSIC at location A of FIG. 1B.

FIG. 3B illustrates a plurality of signal strength measurements of signals detected at a frequency, BCCH #8, over a period of time. In the illustrated example, the period of time (e.g. time window) is the same in FIG. 3B as the period of time in FIG. 3A. In this example, it is evident from FIGS. 3A and 3B that the sampling rate for measuring signal strength is faster for the second example scanner 220 than for the first example scanner 210. In some examples, the sampling rate for the second example scanner 220 is faster than the first example scanner 210 because the first example scanner 220 has BSIC decoding enabled while the second example scanner 220 has BSIC decoding disabled. Cross-referencing the measurements 300B shown in FIG. 3B with measurement locations of the second example scanner 220 in FIG. 1B explains the levels of the signal strength measurements 300B for BCCH #8, which is broadcast from base station 108 of FIG. 1B. For example, FIG. 3B shows minimal, if any, signal strength at location A, high signal strength at or around location B, and average signal strength at or around location C. FIG. 1B shows location A being outside the range of base station 108, which is broadcasting on frequency BCCH #8, location B being near the base station 108, and location C being just within range of the base station 108.

FIGS. 3C and 3D illustrate a second example frequency, BCCH #6, broadcast by base station 106 in accordance with FIG. 1B. The first example scanner 210 and the second example scanner 220 sample BCCH #6 in a similar manner as BCCH #8, described above with regard to FIGS. 3A and 3B. FIG. 3C illustrates signal strength measurements 300C taken by the first example scanner 210 with BSIC decoding enabled. In some examples, the first example scanner 210 samples signals transmitted at frequency BCCH #6 to determine signal strength measurements 300C during a same time period that the second example scanner 220 samples transmitted at frequency BCCH #6 to determine signal strength measurements 300C. In FIG. 3C, the third signal strength measurement 310 is shown as being taken at or around location C, and a BSIC of base station 106 is determined based thereon by decoding the signal detected at BCCH #6. Because locations A and B are outside of the range of base station 106, minimal signal strength measurements, if any, are made by the first example scanner 210 near locations A and B as shown in FIG. 3C, and consequently the first example scanner 210 cannot determine a BSIC at locations A and B of FIG. 1B.

FIG. 3D graphically represents a plurality of signal strength measurements of a frequency, BCCH #6, over a period of time. In the illustrated example, the period of time (e.g. time window) is the same in FIG. 3D as the period of time in FIG. 3C. It is evident from FIGS. 3C and 3D that the sampling rate for measuring the signal strength of signals transmitted on frequency BCCH #6 is faster for the second example scanner 220 than sampling rate of the first example scanner 210. In some examples, the sampling rate for the second example scanner 220 is faster than the first example scanner 210 because the first example scanner 210 has BSIC decoding enabled while the second example scanner 220 has BSIC decoding disabled. Cross-referencing the measurements 300D shown in FIG. 3D with measurement locations of the second example scanner 220 in FIG. 1B explains the levels of the signal strength measurements 300D for BCCH #6, which is broadcast from base station 106 of FIG. 1B. For example, FIG. 3D shows minimal, if any, signal strengths for BCCH #6 at locations A and B, and average signal strength at location C. FIG. 1B shows locations A and B being outside the range of base station 106, which is broadcasting on frequency BCCH #6, location C being just within range of the base station 106.

Referring specifically to FIGS. 3C and 3D, similar principles regarding the signal strength measurements based on time and location as described above with regard to FIGS. 3A and 3B apply. However, FIGS. 3C and 3D show signal strength measurements for BCCH #6, broadcast from base station 106 of FIG. 1B. In some examples, the signal measurement 310 of FIG. 3C is measured by the first example scanner 210 before the signal measurements 300D is measured by the second example scanner 220 before the second of signal measurements 300B.

While an example manner of implementing the example scanning device 200 has been illustrated in FIG. 2, one or more of the elements, processes and/or devices illustrated in FIG. 2 may be combined, divided, re-arranged, omitted, eliminated and/or implemented in any other way. Further, the first example scanner 210, the second example scanner 220, the example correlator 230, the example timestamper 250, the example geographic locator 260 and/or, more generally, the example scanning device 200 of FIG. 2 may be implemented by hardware, software, firmware and/or any combination of hardware, software and/or firmware. Thus, for example, any of, the first example scanner 210, the second example scanner 220, the example correlator 230, the example storage device 240, the example timestamper 250, and the example geographic locator 260 and/or, more generally, the example scanning device 200 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example first example scanner 210, the second example scanner 220, the example correlator 230, the example storage device 240, the example timestamper 250, and the example geographic locator 260 are hereby expressly defined to include a computer readable storage medium such as a memory, DVD, CD, etc. storing the software and/or firmware. Further still, the example scanning device 200 of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the scanning device 200 of FIG. 2 are shown in FIGS. 4-11. In this example, the machine readable instructions comprise program(s) for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray Disc™, or a memory associated with the processor 1312, but the entire program and/or parts thereof could alternatively be executed by a device other than the processor 1312 and/or embodied in firmware or hardware. Further, although the example program is described with reference to the flowcharts illustrated in FIGS. 4-11, many other methods of implementing the example scanning device 200 of FIG. 2 may alternatively be used. For example, the order of execution of the blocks may be changed, and/or some of the blocks described may be changed, eliminated, or combined.

As mentioned above, the example processes of FIGS. 4-11 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a Blu-ray Disc™, a cache, a random-access memory (RAM)) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device or disc and to exclude propagating signals. Additionally or alternatively, the example processes of FIGS. 4-11 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable storage medium is expressly defined to include any type of computer readable storage device or disc and to exclude propagating signals.

Figure 4:
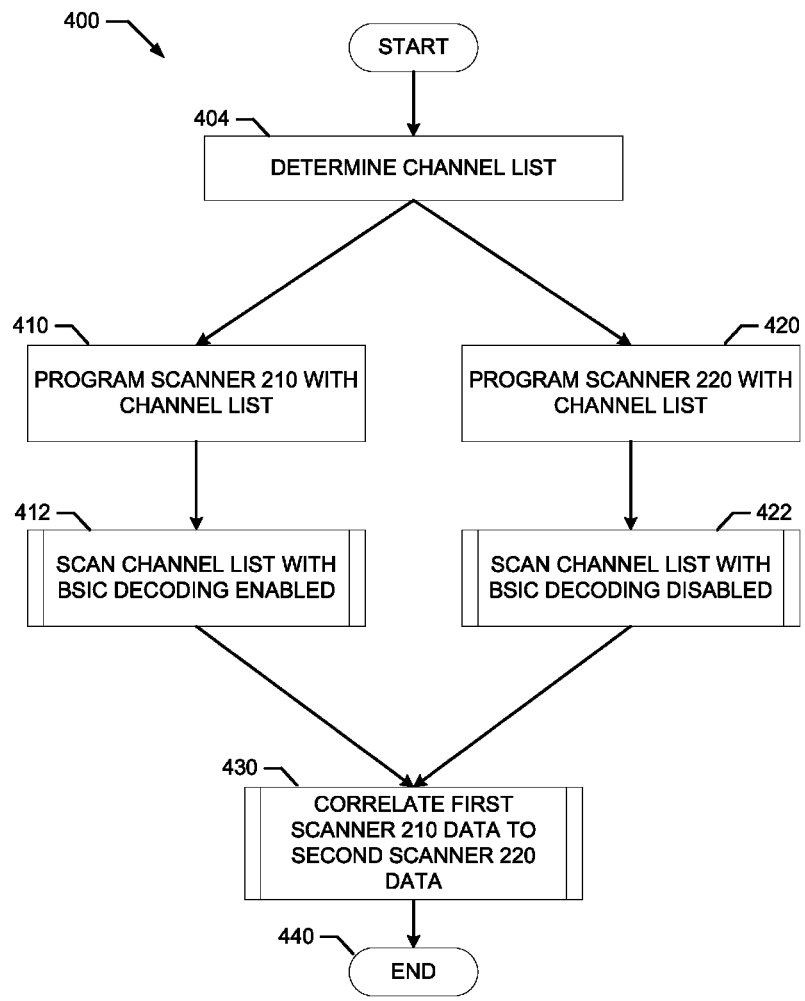
FIG. 4 is a flow chart representative of first example machine readable instructions that may be executed to implement the example scanning device of FIG. 2.

Example machine readable instructions 400 that may be executed to implement the scanning device 200 of FIG. 2 are represented by the flowchart shown in FIG. 4. The machine readable instructions 400 of FIG. 4, upon execution, cause the scanning device 200 to scan a wireless communication spectrum. At block 404, a list of channels of the wireless communication spectrum to be scanned is determined. Any appropriate techniques to determine the channel list may be used, such as heuristics, user input, etc.

At blocks 410 and 420, the first example scanner 210 and the second example scanner 220 are programmed with the determined channel list. At block 412, further described in FIG. 5, the first example scanner 210 scans the channel list with BSIC decoding enabled. At block 422, further described in FIG. 6, the second example scanner 220 scans the channel list with BSIC decoding disabled. In some examples, blocks 412 and 422 occur at substantially the same time. At block 430, further described in FIGS. 7-11, the example correlator 230 associates a BSIC decoded by the first example scanner 210 with measurements sampled by the second example scanner 220. At block 440, the scanning device ends the scan of the wireless communication spectrum. Control may constantly loop through blocks 412, 411, and/or 430 until an interrupt command is entered, such as power off (block 440). Block 430 may be implemented in the scanning device 200 or at a separate data analyzing location.

Figure 5:
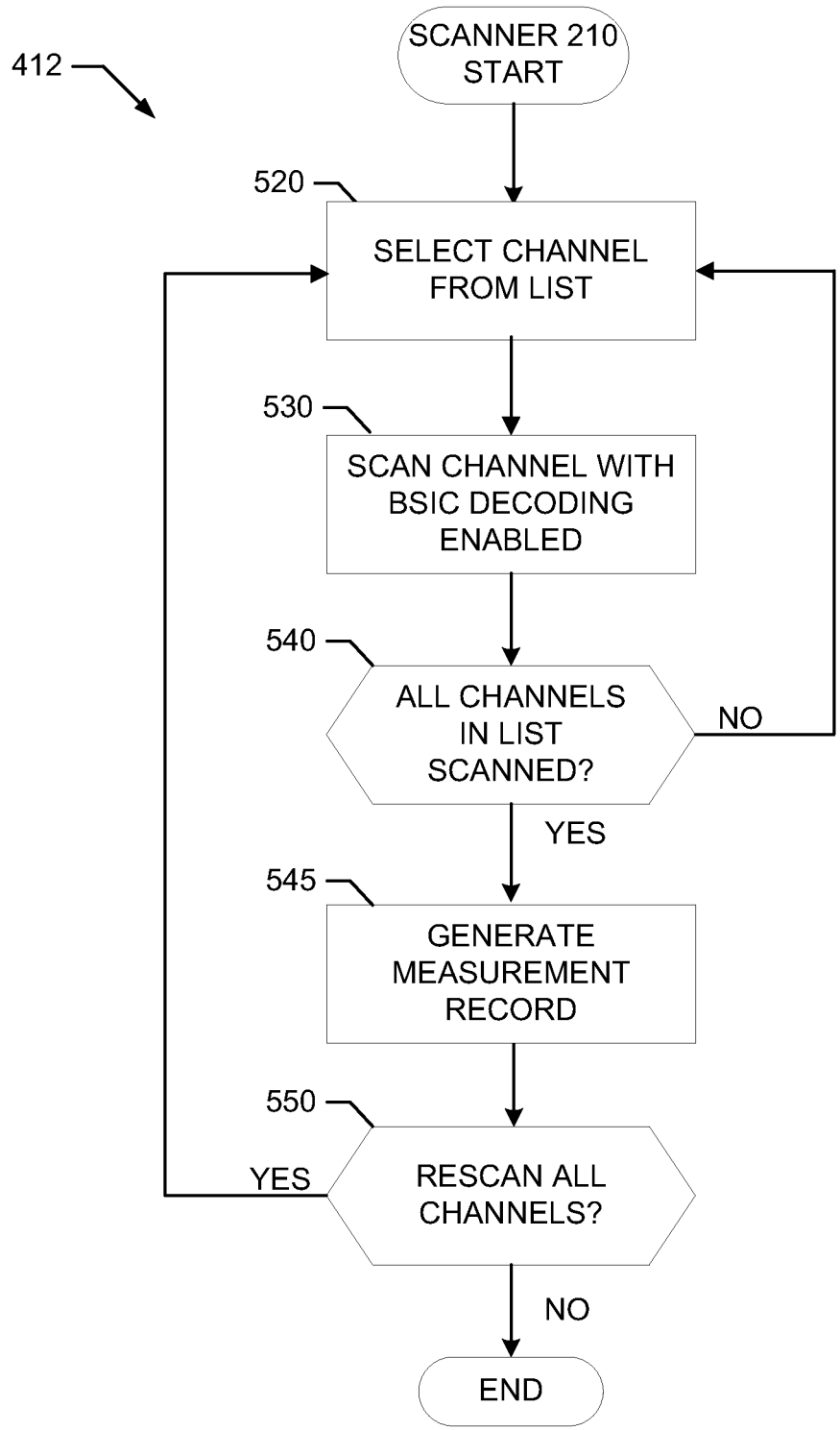
FIG. 5 is a flow chart representative of second example machine readable instructions that may be executed to implement the example scanning device of FIG. 2.

FIG. 5 illustrates example machine readable instructions 412 that may be executed to implement block 412 of FIG. 4. The example instructions 412 begin when the first example scanner 210 the first example scanner 210 selects a channel from the list programmed in block 410 of FIG. 4. At block 530, the first example scanner 210 scans the selected frequency corresponding to the channel (e.g. BCCH #6, BCCH #8) with BSIC decoding enabled. In the illustrated example, the first example scanner 210 scans the selected frequency, identifies the signal being broadcast (e.g. from any base stations 102, 104, 106, 108) if the signal has a signal strength greater than a threshold value (e.g. −120 dBm), and samples the identified frequency (e.g. BCCH #6, BCCH #8) to obtain and/or determine a signal strength measurement (e.g., 300A, 300C) and/or to determine a BSIC from the signal.

At block 540, the first example scanner 210 crosschecks the channel list to determine whether all channels in the list have been scanned for the measurement record. If each of the channels from the channel list has not been scanned, the instructions return to block 520, and the next channel is selected to be scanned. If all of the channels in the list have been scanned, the first example scanner 210 generates a measurement record (e.g., a new line of the data structure of FIG. 12A) to store information (e.g. signal strength measurements and/or BSICs) for the scanned channels in the list (block 545). At block 550, the first example scanner 210 determines whether to rescan all channels in the program list. This example determination may be based on a success rate of the previous measurement record, user input, or any other appropriate criteria. If the first example scanner 210 determines at block 550 that all channels are to be rescanned, control returns to block 520 and a new record measurement is created. If the first example scanner 210 determines at block 550 that the channels are not to be rescanned, the program of FIG. 5 ends.

Figure 6:
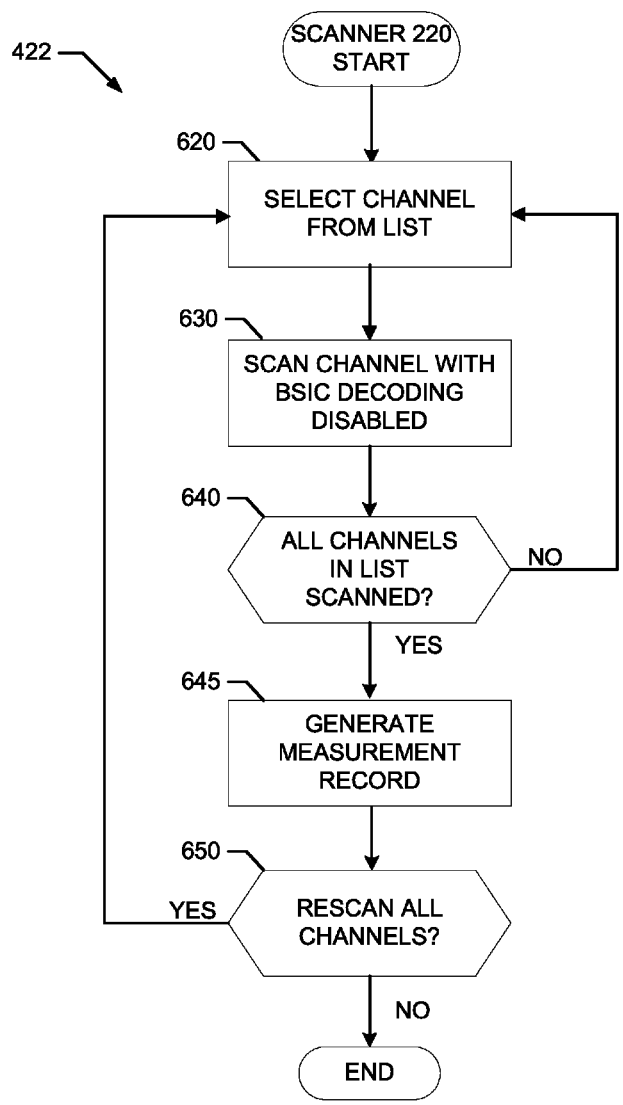
FIG. 6 is a flow chart representative of third example machine readable instructions that may be executed to implement the example scanning device of FIG. 2.

The example machine readable instructions of FIG. 6 may be executed to implement the block 422 of FIG. 4 to scan a channel list with BSIC decoding disabled. The example instructions 422 begin when the second example scanner 220 selects a channel from the list programmed in block 420 of FIG. 4. At block 630, the second example scanner 220 scans a selected frequency (e.g. BCCH #6, BCCH #8) with BSIC decoding disabled. In the illustrated example, because BSIC decoding is disabled, the second example scanner 220 scans the selected frequency at a rate faster than the rate performed by the first scanner 210. In the illustrated example, the second example scanner 220 samples any signal detected at the identified frequency (e.g. BCCH #6, BCCH #8) to obtain and/or determine a signal strength measurement (e.g. 300B, 300D). The second example scanner 220 has BSIC decoding disabled, so it does not decode the sampled signal to obtain a BSIC for the frequency.

At block 640, the second example scanner 220 crosschecks the channel list to determine whether all channels in the list have been scanned for the measurement record. If each of the channels from the channel list has not been scanned, the instructions return to block 620, and the next channel is selected to be scanned. If all of the channels in the list have been scanned, the second example scanner 220 generates a measurement record (e.g., a new line of the data structure of FIG. 12B) to store information for the scanned channels in the list (block 645). At block 650, the second example scanner 220 determines whether to rescan all channels in the program list to generate another measurement record. This example determination may be based on a success rate of the previous measurement record, user input, or any other appropriate criteria. If the second example scanner 220 determines at block 650 that all channels are to be rescanned, the second example scanner 220 returns to block 620 and a new measurement record is created. If the second example scanner 220 determines at block 650 that the channels are not to be rescanned, the program of FIG. 6 ends.

The example machine readable instructions of FIG. 7-11 may be executed to implement the correlator 230 of FIG. 2 and/or to correlate the data collected by the first example scanner 210 with the data collected by the second example scanner 220. At block 720 of the illustrated example, the example correlator 230 determines whether the first example scanner 210 identified BSIC information for a scanned frequency (e.g., BCCH #2, BCCH #4, BCCH #6, BCCH #8). The correlator 230 of the illustrated example may make the determination based on measurement records for the first example scanner 210 stored in the storage device 240 (see FIG. 12A) or may directly receive BSIC information from the first example scanner 210.

If the first example scanner 210 did not identify and/or sample BSIC information for any frequencies scanned in the channel list, the correlator 230 ends the correlation 430. If the first example scanner 210 identifies a BSIC for a frequency scanned in the channel list, the correlator 230 identifies the BCCH (block 740).

At block 750 of the illustrated example, the correlator 230 determines whether the second example scanner 220 has identified and sampled a signal strength for the frequency corresponding to the BCCH identified at block 740. The correlator 230 in the illustrated example may make the determination based on measurement records of the second example scanner 220 stored in the storage device 240 (see FIG. 12B) and/or by receiving information directly from the second example scanner 220. If the correlator 230 determines that the second example scanner 220 did not measure signal strength at the identified frequency in any measurement records at block 750 of the illustrated example, control returns to block 730 to search the records of FIG. 12A for the next BSIC identified by the first example scanner 210. If the correlator does determine that the second example scanner 220 has measured a signal strength for the identified frequency, then the example correlator 230 determines whether to correlate and/or populate the identified BSIC for the frequency from measurement records of the first example scanner 210 (FIG. 12A) to measurement records (FIG. 12B) of the second example scanner for the frequency (block 760). At block 760 of the illustrated example and as further described in FIGS. 8-11, the correlator 230 makes this determination based on a time and/or geographic location of the measurement records for the first example scanner 210 and the second example scanner 220. Control then advances to block 770.

At block 770 of the illustrated example, if the correlator 230 determines that the data from the first example scanner 210 should not be correlated to the data of the second example scanner 220, control returns to block 730 to search the records of FIG. 12A for the next BSIC identified in BSIC fields 1210A by the first example scanner 210. If the correlator does determine that the data (e.g. data in BSIC field 1210A) from the first example scanner 210 should be correlated to the data from the second example scanner 220, then, at block 780 of the illustrated example, the correlator 230 populates a BSIC field 1210B of the second scanner 220 measurement records (FIG. 12B) corresponding to records where the frequency was measured by the second example scanner 220 with the identified BSIC identified in BSIC field 1210A from the first example scanner 210 measurement record (see FIGS. 12A, 12B) (e.g., the BSIC for the BSIC fields 1210A of FIG. 12A is then allocated to the BSIC fields 1210B of the corresponding records in FIG. 12B). Control returns to block 730 to search the records of FIG. 12A for the next BSIC identified in BSIC fields 1210A by the first example scanner 210.

Figure 7:
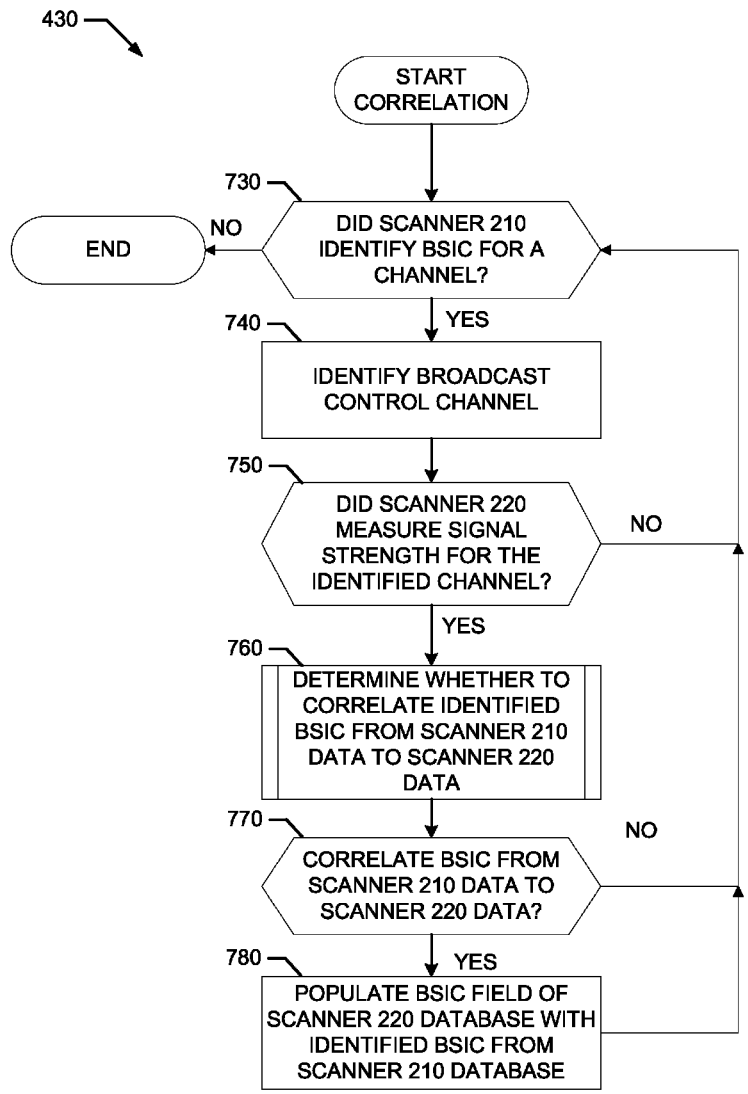
FIGS. 7-11 are flow charts representative of example machine readable instructions that may be executed to implement the example correlator of the example scanning device of FIG. 2.

FIGS. 8-11 illustrates example machine readable instructions 800 which may be executed to implement block 760 of FIG. 7 to determine whether to correlate an identified BSIC in BSIC fields 1210A from a measurement record of the first example scanner 210 to measurement records of the second example scanner 220. At block 820 of the illustrated example, the correlator 230 determines a setting of the correlator 230. In some examples, the setting of the correlator 230 can be entered by a user via input devices 1322 of FIG. 13. In some examples the setting can be automatically selected by the correlator 230 based on results of the scans of the first example scanner 210 and/or the second example scanner 220.

For example, automatic selection of using time only as the correlation setting may be appropriate when the correlator 230 determines that the geographic locator 260 was unable to determine the geographic location (e.g. due to an example GPS signal being insufficient to determine a latitude and longitude of the scanning device 200) for one or more measurement records of the first example scanner 210 and/or the second example scanner 220.

At block 830 of the illustrated example, the correlator 230 selects the appropriate method to determine whether to correlate data from the first example scanner 210 to data from the second example scanner 220 be determining if the correlation is based on time only. If, at block 820 of the illustrated example, the correlator 230 determined that the correlation setting is time only, the correlator 230, at block 840, determines whether the BSIC associated with the frequency identified in a measurement record of the first example scanner 210 with one or more measurement records of the second example scanner 220 for the frequency based on timestamps and one or more time windows, as further described in FIG. 9. If, at block 830 of the illustrated example, the correlator 230 determines that the correlation setting is not to be based on time only, the correlator 230 then determines at block 850 if the correlation setting is geographic location only.

Figure 10:
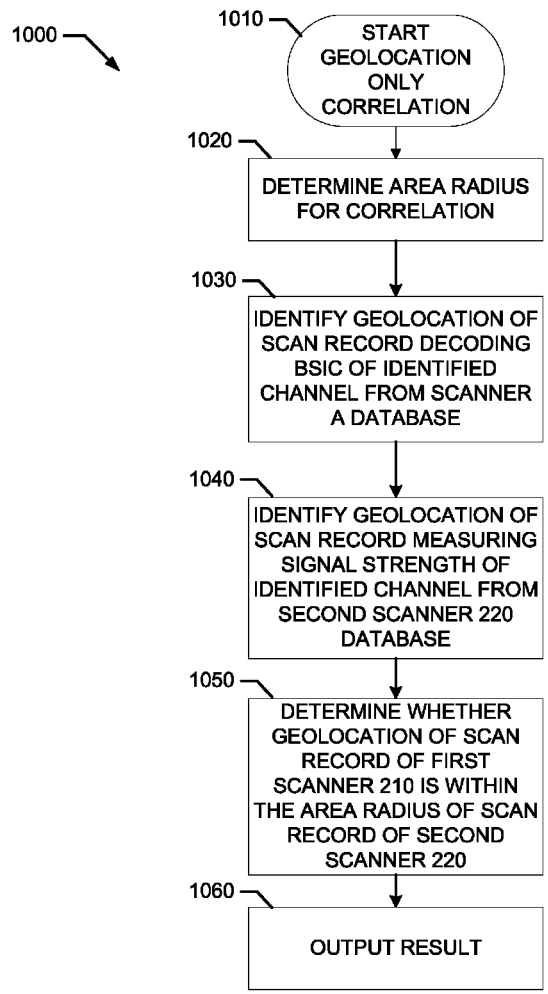

If, at block 850 of the illustrated example, the correlator 230 determined that the correlation is to be based on geographic location only, the correlator 230, at block 860, determines whether to correlate the BSIC of the frequency identified in a measurement record (e.g. the identified BSIC in BSIC fields 1210A of FIG. 12A) of the first example scanner 210 with one or more measurement records of the second example scanner 220 for the frequency based on geographic locations and an area radius, further described in FIG. 10. If, at block 820 of the illustrated example, the correlator determined that the correlation setting is not geographic location only, then the correlator 230, at block 870, determines whether to correlate the BSIC associated with a frequency and identified in a measurement record (e.g. the identified BSIC in BSIC fields 1210A of FIG. 12A) of the first example scanner 210 with one ore more measurement records of the second example scanner 220 for the frequency based on time and geographic location using timestamps, one or more time windows, geographic locations, and an area radius, as further described in FIG. 11. At block 880 of the illustrated example, a result of the determination is output for use in block 780 of FIG. 7.

Figure 8:
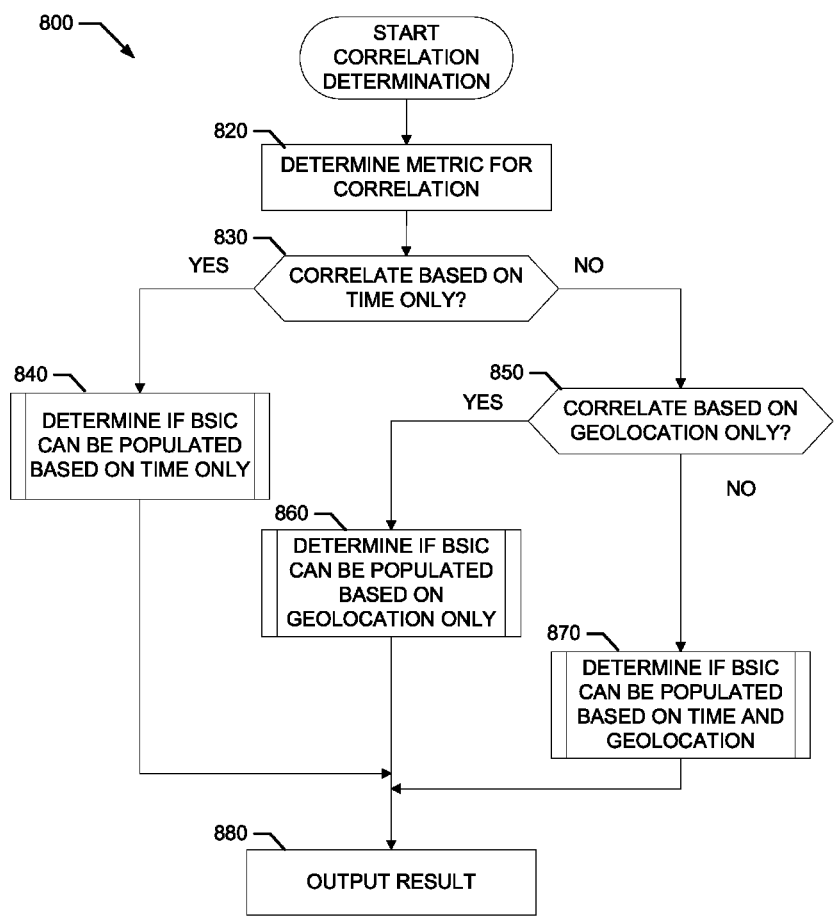
Figure 9:
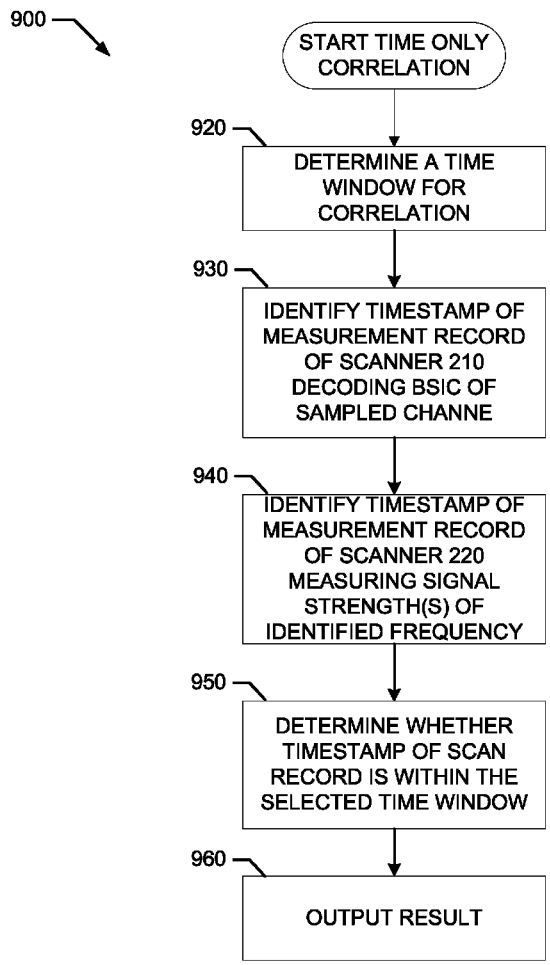

The example machine readable instructions of FIG. 9 may be executed to implement block 840 of FIG. 8 to correlate measurement record(s) of the first example scanner 210 to measurement record(s) of the second example scanner 220 based only on time of occurrence. A time window (T) is determined for the correlation at block 920 of the illustrated example. The determination of the time window (T), at block 920 of the illustrated example, may be based on a user input via input devices 1322 of FIG. 13 or may be adjusted by the correlator 230 based on any appropriate criteria, such as geographic location, signal strength measurement reliability, etc.

At block 930 of the illustrated example, the correlator 230 identifies a timestamp(s) of measurement record(s) of the first example scanner 210 (see FIG. 12A) in which the frequency in question has been assigned a decoded BSIC. At block 940 of the illustrated example, the correlator 230 identifies timestamp(s) of measurement record(s) of the second example scanner 220 where signal strength measurements were made for the corresponding frequency.

At block 950 of the illustrated example, the correlator 230 determines whether the timestamp(s) of the measurement record(s) of the first example scanner 210 and the second example scanner 220 are within the identified time window determined in block 920. In some examples, the identified time window (T) is centered on measurement record time(s) ($T_C$) at which signal strength measurement(s) are made by the second example scanner 220. Accordingly the span of the time window (T) is from ($T_C$−T/2) to ($T_C$+T/2). In the illustrated example, at block 950, when a time stamp for a measurement record of the first example scanner 210 corresponding to the BSIC from the frequency in question is within the above span of time, the decoded BSIC from the BSIC fields 1210A is correlated to measurement records of the second example scanner 220 by populating BSIC fields 1210B with the corresponding BSIC of the frequency in question.

Examples of the use of a time window are shown in FIGS. 3A-3D. In FIGS. 3A, 3B a signal strength measurement of BCCH #8 made at $T_{C8}$ establishes a center point ($T_{C8}$) of time window ($T_8$). From there, one or more of the measurement records 300B within time window $T_8$, which spans from ($T_{C8}$−T/2) to ($T_{C8}$+T/2), is assigned the BSIC decoded for BCCH #8. Accordingly, another example of a time window in FIGS. 3C, 3D shows that a signal strength measurement of BCCH #6 is made at $T_{B6}$, which then establishes a center point of time window ($T_6$).

The example machine readable instructions 1000 of FIG. 10 may be executed to implement block 860 of FIG. 8 to correlate measurement record(s) of the first example scanner 210 to measurement record(s) of the second example scanner 220 geolocation data. A radius (R) is determined for the correlation at block 1020 of the illustrated example. The determination of the area radius (R), at block 1020 of the illustrated example, may be based on a user input via input devices 1322 of FIG. 13 or may be adjusted by the correlator 230 based on any appropriate criteria, such as geographic location, timing of measurement records, signal strength measurement reliability, etc.

At block 1030 of the illustrated example, the correlator 230 identifies geographic location(s) of where the scanning device 200 was located for measurement record(s) of the first example scanner 210 (see FIG. 12A) in which the BSIC was identified for the frequency in question. At block 1040 of the illustrated example, the correlator 230 identifies geographic location(s) of measurement record(s) of the second example scanner 220 where signal strength measurement(s) were made for frequency in question.

At block 1050 of the illustrated example, the correlator 230 determines whether the geographic location(s) of the measurement record(s) of the first example scanner 210 and the second example scanner 220 are within the radius (R) determined in block 1020. In some examples, the radius (R) is measured from the center of an area at which signal strength measurement(s) are made by the second example scanner 220. Accordingly, the area is a circle having a radius equal to the radius (R). In the illustrated example, at block 1050, when a geographic location for a measurement record of the first example scanner 210 that decodes a BSIC from a frequency is within the above area (as measured by radius R), the decoded BSIC is correlated to measurement records of the second example scanner 220 by populating BSIC fields 1210B with the corresponding BSIC of the frequency in question.

Figure 11:
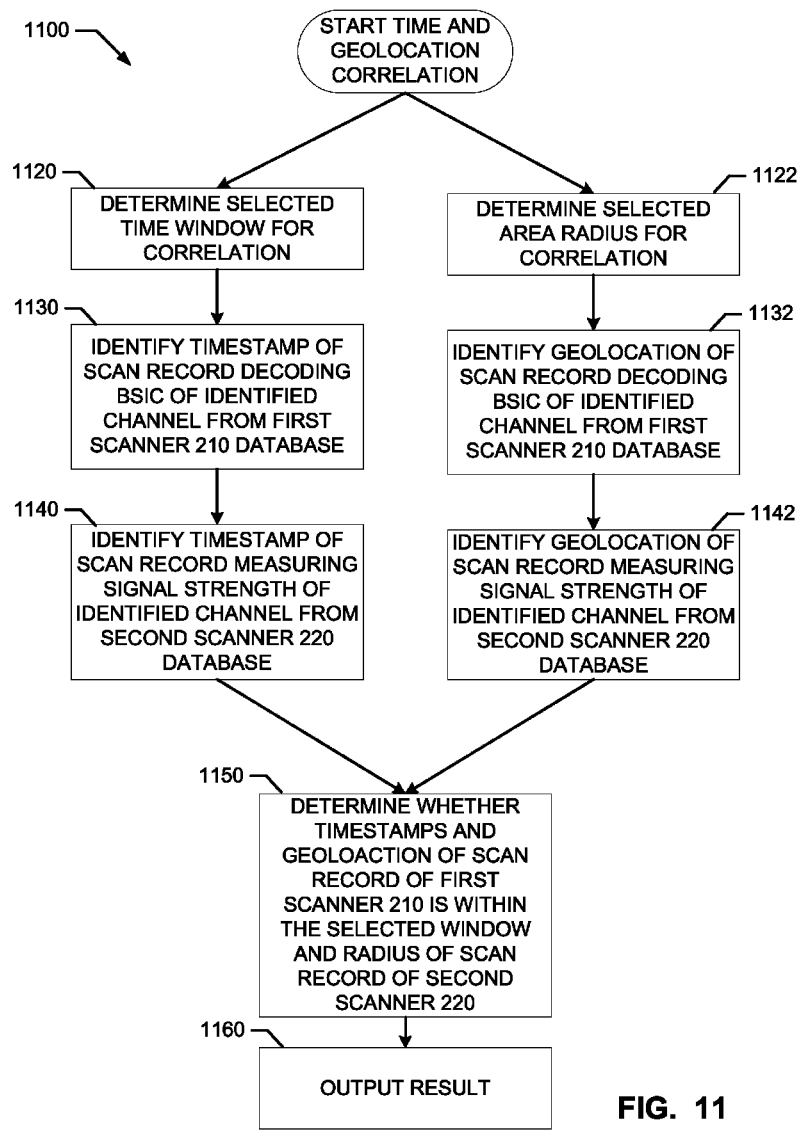

The example machine readable instructions of FIG. 11 may be executed to implement block 870 of FIG. 8 to correlate measurement record(s) of the first example scanner 210 to measurement record(s) of the second example scanner based on time and geolocation data of the measurement records. A time window (T) and an radius (R) are determined for the correlation at respective blocks 1120 and 1122 of the illustrated example.

At blocks 1130, 1132 of the illustrated example, similar to respective blocks 930, 1030, the correlator 230 identifies a timestamp(s) and geographic location(s) of measurement record(s) of the first example scanner 210 (see FIG. 12A) in which the BSIC was identified for the frequency in question. At blocks 1140, 1142 of the illustrated example, similar to respective blocks 940, 1040, the correlator 230 identifies timestamp(s) and geographic location(s) of measurement record(s) of the second example scanner 220 of when and where signal strength measurements were made for the frequency in question.

At block 1150 of the illustrated example, similar to blocks 950, 1050, the correlator 230 determines whether both the timestamp(s) and geographic location(s) of the measurement record(s) of the first example scanner 210 and the second example scanner 220 are within both the time window (T) and the radius (R) determined in blocks 1120, 1122. At block 1150 of the illustrated example, when a timestamp and a geographic location for a measurement record of the first example scanner 210 that decodes a BSIC from a frequency is both within the above time window T and area having a radius R, the decoded BSIC is correlated to measurement records of the second example scanner 220 by populating BSIC fields 1210B with the corresponding BSIC of the frequency in question.

FIGS. 12A, 12B illustrate example data structures 1200A, 1200B stored in example databases of the example scanning device of FIG. 2. FIG. 12A shows an example data structure 1200A stored by the first example scanner 210 having a title row identifying data fields for a record identifier, a date of the record, a time of the record, a geographic latitude of the record, a geographic longitude of the record, frequencies (BCCHs) of the record, energy levels (Rxlevs), and BSICs of the record and three rows designating measurement records 1-3. The columns of FIG. 12A in the illustrated example identify the above data fields and values for those data fields. In the illustrated example, BCCH[6] and BCCH[8] and their channel allocation values are provided as examples from FIGS. 3A, 3C. In the illustrated example, corresponding signal strength measurements (Rxlev[6] and Rxlev[8]) are provided as well as corresponding base station identifiers, i.e. BSICs, (106, 108). All values are provided strictly as examples and do not reflect actual decoded information or measure values. The example data structure 1200A of FIG. 12A denotes BCCH[n], Rxlev[n], and BSIC[n] to indicate that any number of 'n' frequencies or channels may be included in the data structure.

FIG. 12B shows an example data structure 1200B stored by the second example scanner 220, having the same title row as data structure 1200A except for complete BSIC column. Because the second example scanner 220 scans the frequencies of an example wireless communication spectrum with BSIC decoding disabled, the example BSIC column is not populated in the second example scanner 220 until the BSIC is correlated from the first example scanner 210. In some examples, the BSIC from data structure 1200A is correlated to data structure 1200B when the correlator 230 determines that a frequency (e.g., BCCH[6], BCCH[8]) has been scanned, identified, and sampled by the second example scanner 220 and a record from data structure 1200A has a BSIC for the frequency decoded from the first example scanner 210. This correlation need not be done in the scanning device 200 but instead can be done at a collection facility that derives data from many scanning devices.

In the illustrated example, FIGS. 12A, 12B show that the first example scanner 210 decoded and identified a BSIC for each of BCCH[6] and BCCH[8] in measurement records 2 and/or 3. Accordingly, FIGS. 12A, 12B show in the illustrated example that the BSICs (BSIC[6], BSIC[8]) for BCCH[6] and BCCH[8] respectively have been correlated from data structure 1200A, as data structure 1200B has populated a BSIC value for BSIC[6] and BSIC[8] for all measurement records where BCCH[6] (records 17-20) and BCCH[8] (records 4-15, 18-20) were scanned, identified, and sampled (e.g. measured a signal strength).

Furthermore, the example data structure provide the above information along with geographic location (latitude and longitude), enabling a user to determine which base station a frequency or signal is measured at that location.

Figure 13:
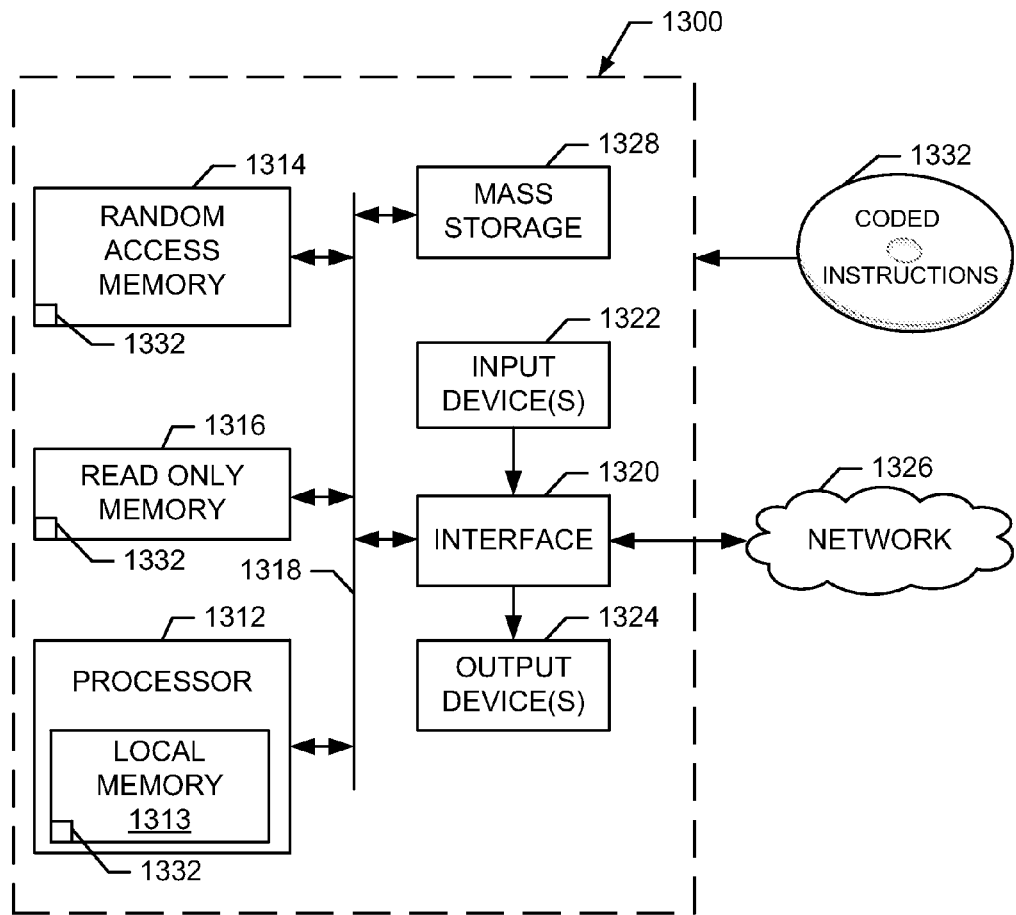
FIG. 13 is a block diagram of an example processor platform that may execute the instructions of FIGS. 4-10 and/or 11 to implement the example scanning device of FIG. 2.

FIG. 13 is a block diagram of an example processor platform 1300 capable of executing the instructions of FIGS. 4-11 and/or to implement the scanning device of FIG. 2. The processor platform 1300 can be, for example, a server, a personal computer, a mobile phone (e.g., a cell phone), a personal digital assistant (PDA), an Internet appliance, a dedicated scanning device, or any other type of computing device.

The system 1300 of the instant example includes a processor 1312. For example, the processor 1312 can be implemented by one or more Intel® microprocessors from the Pentium® family, the Itanium® family or the XScale® family. Of course, other processors from other families are also appropriate.

The processor 1312 is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1314, 1316 is typically controlled by a memory controller (not shown).

The processor platform 1300 also includes an interface circuit 1320. The interface circuit 1320 may be implemented by any type of interface standard, such as an Ethernet interface, a universal serial bus (USB), and/or a PCI express interface.

One or more input devices 1322 are connected to the interface circuit 1320. The input device(s) 1322 permit a user to enter data and commands into the processor 1312. The input device(s) can be implemented by, for example, a keyboard, a mouse, a touchscreen, a track-pad, a trackball, isopoint and/or a voice recognition system.

One or more output devices 1324 are also connected to the interface circuit 1320. The output devices 1024 can be implemented, for example, by display devices (e.g., a liquid crystal display, a cathode ray tube display (CRT), a printer and/or speakers). The interface circuit 1320, thus, typically includes a graphics driver card.

The interface circuit 1320 also includes a communication device (e.g., antenna 201, the first example scanner 210, the second example scanner 220) such as a modem or network interface card to facilitate exchange of data with external computers via a network 1326 (e.g., an Ethernet connection, a digital subscriber line (DSL), a telephone line, coaxial cable, a cellular telephone system, etc.).

The processor platform 1300 also includes one or more mass storage devices 1328 for storing software and data. Examples of such mass storage devices 1328 include floppy disk drives, hard drive disks, compact disk drives and digital versatile disk (DVD) drives. The mass storage device 1328 may implement the local storage device 240.

The coded instructions of FIGS. 4-11 and data structure of FIGS. 12A, 12B may be stored in the mass storage device 1328, in the volatile memory 1314, in the non-volatile memory 1316, and/or on a removable storage medium such as a CD or DVD From the foregoing, it will appreciate that above disclosed methods, apparatus and/or articles of manufacture allow for a wireless communication scanner to identify base stations at a higher rate of speed to thereby generate a secure map of a wireless communication system, enabling a user to identify a source of a signal while also being able efficiently scan for several signal strength measurements of the signal.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
    detecting with a first scanner scanning at a first rate a base station identifier for a frequency of a wireless communication spectrum;
    detecting with a second scanner scanning at a second rate, different from the first rate, a plurality of signal strengths of signals at the frequency without determining a base station identifier; and
    determining that the base station identifier is associated with a subset of the plurality of signal strengths by comparing at least one of times and physical locations at which the base station identifier and the plurality of signal strengths were detected.

2. A method as defined in claim 1, wherein the first scanner and the second scanner are located in a scanner housing and implemented by first and second digital signal processors, respectively.

3. A method as defined in claim 1, wherein the first and second scanners operate simultaneously.

4. A method as defined in claim 1, wherein the first frequency corresponds to a channel of the wireless communication spectrum and the wireless communication spectrum is a global system for mobile communication (GSM).

5. A method as defined in claim 1, further comprising timestamping the base station identifier and the plurality of signal strengths,
    wherein determining that the base station identifier is associated with the subset of the plurality of signal strengths comprises determining a first timestamp associated with the base station identifier is within a time period of a second timestamp associated with one of the plurality of signal strengths in the subset.

6. A method as defined in claim 1, further comprising determining a geolocation of the first scanner when the first scanner determines the base station identifier and a plurality of geolocations of the second scanner when the second scanner determines corresponding ones of the plurality of signal strengths,
    wherein determining that the base station identifier is associated with the subset of the plurality of signal strengths comprises determining a first geolocation associated with the base station identifier is within a radius of corresponding ones of the plurality of geolocations.

7. A method as defined in claim 1, further comprising timestamping the base station identifier and the plurality of signal strengths; and
    determining a geolocation of the first scanner when the first scanner determines the base station identifier and a plurality of geolocations of the second scanner when the second scanner determines corresponding ones of the plurality of signal strengths,
    wherein determining that the base station identifier is associated with the subset of the plurality of signal strengths comprises determining a first timestamp associated with the base station identifier is within a time period of a second timestamp associated with one of the plurality of signal strengths in the subset, and
    wherein determining the base station identifier is associated with the subset of the plurality of signal strengths comprises determining a first geolocation associated with the base station identifier is within a radius of corresponding ones of the plurality of geolocations.

8. A method as defined in claim 1, wherein, detecting with the first scanner determines a second plurality of signal strengths for the frequency.

9. A method as defined in claim 1, wherein the second rate is faster than the first rate.

10. An apparatus comprising:
    a first scanner to scan a frequency of a wireless communication spectrum at a first rate to identify a base station identifier;
    a second scanner to scan the frequency at a second rate different from the first rate to determine a plurality of signal strengths; and
    a correlator to determine that the base station identifier is associated with a subset of the plurality of signal strengths by comparing at least one of timestamps and physical locations of the first and second scanners when the base station identifier and the plurality of signal strengths were detected.

11. An apparatus as defined in claim 10, wherein the first scanner and the second scanner are located in a scanner housing and implemented by a first and second digital signal processor, respectively.

12. An apparatus as defined in claim 10, wherein the first and second scanners operate simultaneously.

13. An apparatus as defined in claim 10, wherein the first frequency corresponds to a channel of the wireless communication spectrum and the wireless communication spectrum is a global system for mobile communication (GSM).

14. An apparatus as defined in claim 10, further comprising a timestamper to timestamp the base station identifier and the plurality of signal strengths,
    wherein the correlator is to determine that the base station identifier is associated with the subset of the plurality of signal strengths by determining a first timestamp associated with the base station identifier is within a time period of a second timestamp associated with one of the plurality of signal strengths in the subset.

15. A apparatus as defined in claim 10, further comprising a geolocator to determine a geolocation of the first scanner when the first scanner determines the base station identifier and a plurality of geolocations of the second scanner when the second scanner determines corresponding ones of the plurality of signal strengths,
    wherein the correlator is to determine that the base station identifier is associated with the subset of the plurality of signal strengths by determining a first geolocation associated with the base station identifier is within a radius of corresponding ones of the plurality of geolocations.

16. An apparatus as defined in claim 10, further comprising a timestamper to timestamp the base station identifier and the plurality of signal strengths; and
    a geolocator to determine a geolocation of the first scanner when the first scanner determines the base station identifier and a plurality of geolocations of the second scanner when the second scanner determines corresponding ones of the plurality of signal strengths,
    wherein the correlator is to determine that the base station identifier is associated with the subset of the plurality of signal strengths by determining a first timestamp associated with the base station identifier is within a time period of a second timestamp associated with one of the plurality of signal strengths in the subset, and
    wherein the correlator is to determine the base station identifier is associated with the subset of the plurality of signal strengths by determining a first geolocation associated with the base station identifier is within a radius of corresponding ones of the plurality of geolocations.

17. An apparatus as defined in claim 10, wherein the first scanner is to detect a second plurality of signal strengths for the frequency.

18. An apparatus as defined in claim 10, wherein the second rate is faster than the first rate.

19. A machine readable storage medium comprises instructions which, when executed, cause a machine to at least:
    cause a first scanner scanning at a first rate to detect a base station identifier for a frequency of a wireless communication spectrum;
    cause a second scanner scanning at a second rate, different from the first rate, to detect a plurality of signal strengths of signals at the frequency without determining a base station identifier; and
    determine that the base station identifier is associated with a subset of the plurality of signal strengths by comparing at least one of times and physical locations at which the base station identifier and the plurality of signal strengths were detected.

20. A storage medium according to claim 19, wherein the first scanner and the second scanner are located in a scanner housing and implemented by first and second digital signal processors, respectively.

21. A storage medium according to claim 19, wherein first and second scanners operate simultaneously.

22. A storage medium according to claim 19, wherein the first frequency corresponds to a channel of the wireless communication spectrum and the wireless communication spectrum is a global system for mobile communication (GSM).

23. A storage medium according to claim 19, wherein the instructions cause the machine to timestamp the base station identifier and the plurality of signal strengths,
    wherein the instructions cause the machine to determine that the base station identifier is associated with the subset of the plurality of signal strengths by determining a first timestamp associated with the base station identifier is within a time period of a second timestamp associated with one of the plurality of signal strengths in the subset.

24. A storage medium according to claim 19, wherein the instructions cause the machine to determine a geolocation of the first scanner when the first scanner determines the base station identifier and a plurality of geolocations of the second scanner when the second scanner determines corresponding ones of the plurality of signal strengths,
    wherein the instructions cause the machine to determine that the base station identifier is associated with the subset of the plurality of signal strengths by determining a first geolocation associated with the base station identifier is within a radius of corresponding ones of the plurality of geolocations.

25. A storage medium according to claim 19, wherein the instructions cause the machine to timestamp the base station identifier and the plurality of signal strengths; and
    determine a geolocation of the first scanner when the first scanner determines the base station identifier and a plurality of geolocations of the second scanner when the second scanner determines corresponding ones of the plurality of signal strengths,
    wherein the instructions cause the machine to determine that the base station identifier is associated with the subset of the plurality of signal strengths by determining a first timestamp associated with the base station identifier is within a time period of a second timestamp associated with one of the plurality of signal strengths in the subset, and
    wherein the instructions cause the machine to determine the base station identifier is associated with the subset of the plurality of signal strengths by determining a first geolocation associated with the base station identifier is within a radius of corresponding ones of the plurality of geolocations.

26. A storage medium according to claim 19, wherein the first scanner is to detect a second plurality of signal strengths for the frequency.

27. A storage medium according to claim 19, wherein the second rate is faster than the first rate.

* * * * *